United States Patent [19]

McKinney

[11] Patent Number: 4,669,923
[45] Date of Patent: Jun. 2, 1987

[54] RADIUS CUTTING EDGING TOOL WITH GUIDE WHEEL

[76] Inventor: Johnathan R. McKinney, 4831 Southwest 11th Ct., Plantation, Fla. 33317

[21] Appl. No.: 863,305
[22] Filed: May 15, 1986
[51] Int. Cl.$^4$ ............................ B26D 1/12; B23C 5/14
[52] U.S. Cl. ................................ 407/34; 144/134 D; 144/145 C; 144/371; 407/54; 407/62
[58] Field of Search ................... 407/30, 34, 36, 42, 407/53, 54, 62; 144/134 D, 134 R, 145 C, 350, 371

[56] References Cited

U.S. PATENT DOCUMENTS

| | | | |
|---|---|---|---|
| 2,839,107 | 6/1958 | Emmons | 144/134 D |
| 3,089,353 | 5/1963 | Craven | 76/101 A |
| 3,289,717 | 12/1966 | Dutot | 144/134 D |
| 3,678,554 | 7/1972 | Ezhov et al. | 407/62 |
| 3,718,958 | 3/1973 | Brucker | 144/134 D |
| 3,774,279 | 11/1973 | Hunter | 407/30 |
| 4,280,774 | 7/1981 | Hayama | 407/36 |
| 4,614,463 | 9/1986 | Hughes | 407/62 |

*Primary Examiner*—Nicholas P. Godici
*Assistant Examiner*—Jerry Kearns
*Attorney, Agent, or Firm*—Alvin S. Blum

[57] ABSTRACT

A carbide tipped, ball bearing guided router bit has specially shaped cutting edges. It trims the overhanging edge of a plastic laminate cemented to a supporting base so that it is flush with the edge of the supporting base with the upper portion of the trimmed edge gently curved. It exposes only a minimum of the core of the laminate to view. The shape of the cutting edge includes a first straight portion at an acute angle to the axis of rotation, an arcuate portion and a second straight portion. The two straight portions are tangential to the arcuate portion at each end of the arc.

10 Claims, 1 Drawing Figure

RADIUS CUTTING EDGING TOOL WITH GUIDE WHEEL

FIELD OF THE INVENTION

This invention relates to improvements in a rotary cutting edging tool with guide wheel and more particularly to a router bit for trimming away the overhanging edge of a plastic laminate while providing a rounded finished edge without excessive exposure of the laminate's core.

BACKGROUND OF THE INVENTION

Search of the prior art revealed the following related U.S. Patents that do not teach the improvements of the instant invention: U.S. Pat. Nos. 4,280,774—U.S. Pat. No. 3,803,950—U.S. Pat. No. 3,774,279—U.S. Pat. No. 3,289,717.

A family of hard plastic laminate materials comprising a very thin decorative surface covering a less decorative, thicker structural core, as exemplified by the trademark Formica, is widely used to cover wooden structures to impart improved surface properties including durability and appearance. The laminate is generally cut oversize, cemented to the wooden surface, and when the overhanging edge is trimmed flush with the edge of the wood to create the visual impression that the thin, deoorative surface, e.g. a wood grain, represents the material of construction. The edge is then very slightly rounded to remove the sharp, hard edge. Flush cutting is generally performed with a flush cutting router bit having a rotary guide wheel or a non-cutting pilot cylinder at one end, and a cylindrical cutter of slightly smaller diameter above it. Mounted in a router, the guide wheel bears against the edge of the base while the rapidly rotating cylindrical cutter cuts away the overhanging laminate. The very slightly reduced diameter of the cutter relative to the guide wheel provides clearance for the cutter from the base. The resulting slight overhang and sharp upper corner of the laminate is removed by a hand filing finishing operation requiring skill and adding cost. Attempts made to overcome this finishing operation include (a) bevel cutters or (b) quarter round cutters. A bevel cutter uses a cylindrical cutter that is a conic section with the smaller diameter, smaller than, and. adjacent to the guide wheel. The depth of cut can be adjusted to cut a bevel in the laminate with the cemented surface perfectly flush with the base edge. If the angle of the bevel is great enough, the sharp edge of the laminate is removed, but a large band of the core is exposed, marring the finished appearance. If, on the other hand, the angle is small to reduce the exposed core, the edge of the laminate remains sharp, i.e. close to a right angle and requires rounding with a hand tool. A quarter round cutter has a cutting edge that generates a cut surface that is a 90° arc of a circle, with a slight clearance relative to the guide wheel to avoid marring the edge of the base. The cutting edge shape limits adjustability. If the cutter is set high, the edge produced is almost parallel to the base edge, leaving a slight overhang so that filing is required. If the cutter is set low, the edge produced is almost parallel to the laminate surface, exposing too much core. The problem is so serious and so poorly resolved by cutters of the prior art that laminate manufactures are developing, at great expense, laminates with a core closer in appearance to the surface material so that the exposed core will not be as evident.

SUMMARY OF THE INVENTION

A principal object of the invention is to provide a wheel guide on a rotary cutter having cutting edges with a shape including a first, straight portion, a second, arc of a circle portion, and a third, straight portion. The two straight portions are coextensive with the arc portion and are substantially tangential to the arc portion at the joining points. The first straight portion forms an acute angle to the axis of rotation. When rotating, the cutting edge generates a section of a cone, whose smaller diameter is adjacent the guide wheel and slightly smaller than the guide wheel diameter to provide clearance along the base edge. The tool is used in a router by adjusting the depth of the guide wheel below the exposed upper surface of the laminate so that the cemented (inner) surface of the laminate is cut at its edge by a point on the first straight portion (tangent 1) of the cutting edge. That particular point on the cutting edge coincides with the diameter of the guide wheel thereby ensuring that the laminate will be cut flush with the base edge at its contact with the base when the cutting wheel is guided along the base edge. That portion of the core adjacent the inner surface is cut at an acute angle to the base edge by the balance of tangent 1 to expose a minimum of core. The arc portion of the cutting edge will then automatically cut a small diameter radius from the end of the acute angle to the upper surface of the laminate without any exercise of skill from the user. Because the radius of the arc is small and the dimensions of the cutting edge are designed to fit the thickness of the particular laminate, the edge will be rounded without exposing much of the core. The last straight edge will not generally cut laminate except when there is a surface irregularity or the laminate is unusually thick. If it does cut the laminate it will be a bevel cut and it will not gouge out the surface as would the upper edge of a quarter round cutter which is perpendicular to the axis of rotation.

It is another object of the invention to provide a tool as described above with cutting edges having a vertical rake angle that presents the cutting edge farthest from the guide wheel to the workpiece first and the cutting edge closest to the workpiece last as the tool rotates on its axis. This rake angle forces the laminate against the base support while cutting, ensuring firm contact between laminate and support. By contrast, tools with a zero rake angle (wherein the plane of the cutting edge is parallel to the axis of rotation) or a rake angle opposite to that herein described are taught by the prior art because they throw chips away from the workpiece for smoother cutting. This is an advantage in wood cutting, but when used with laminates, it tends to lift the laminate from the base and interferes with a proper finish if the cementing is not perfect.

The tool may be formed of a single piece with a solid pilot cylinder for a guide. The guide wheel may be an attached ball bearing wheel. The tool may be of composite construction with attached pieces of a hard material such as a silicon carbide formed into the cutting surfaces.

DESCRIPTION OF THE PREFERRED EMBODIMENT

Figure 1:
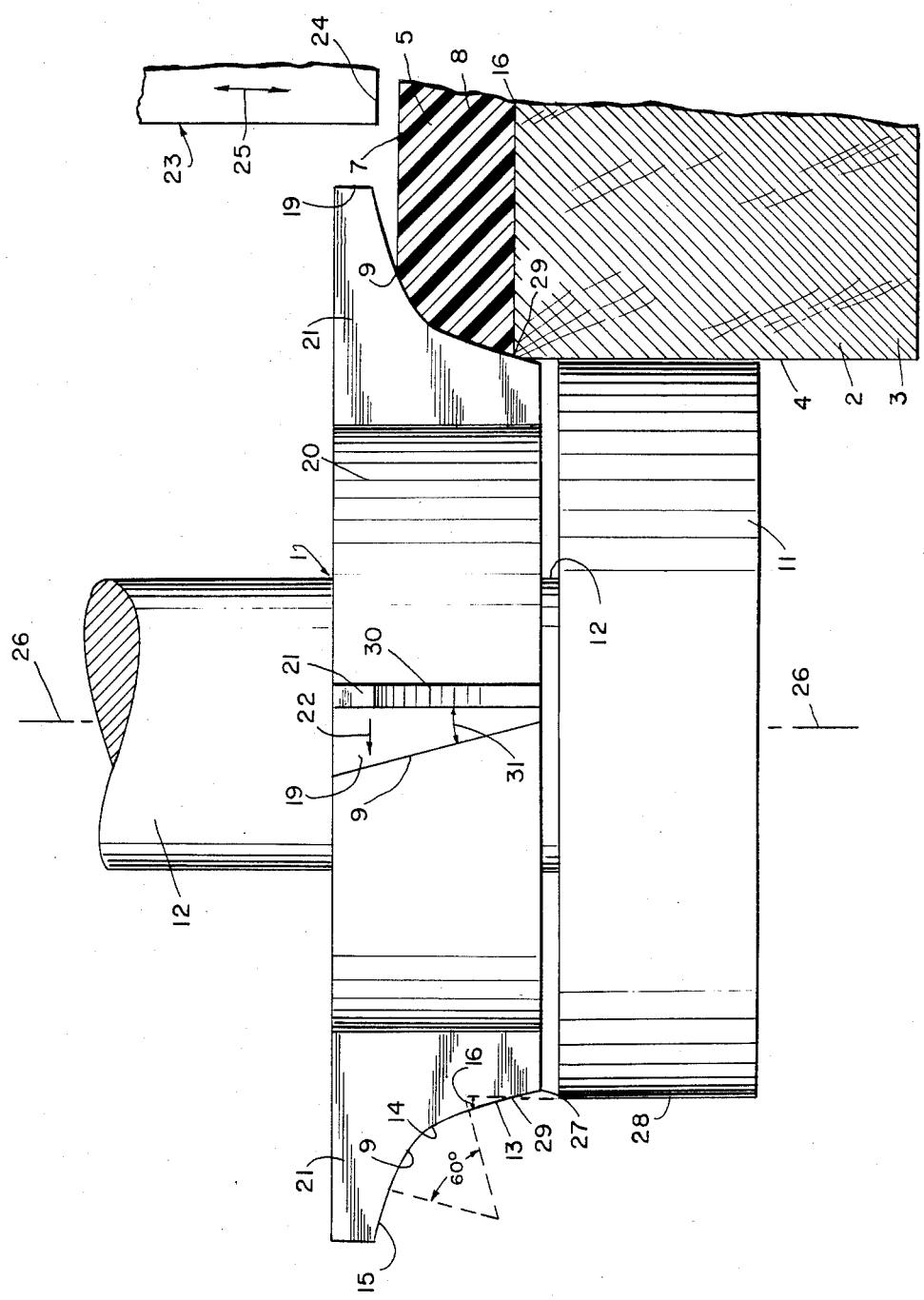
FIG. 1 is a front elevation view of the tool of the invention in use trimming a laminated surface.

Referring now to the tool of the invention shown in FIG. 1, designated by the reference number 1, the tool 1 is adapted to be held in a router type tool, well known in the art, by the shank 12 whose upper portion is broken away. The shank 12 supports a cutter body 20, substantially cylindrical in shape, and having two or more cutter blades 21 radially projecting therefrom. The portion 19 of the cutter blades 21 engaging the workpiece 2 is formed of a more durable material such as silicon carbide that is securely attached to the cutter blades 21. The shank, body and blades are generally formed of steel. This construction is generally termed a carbide-tipped router bit. Attached below the cutter body 20 is ball bearing guide wheel 11 mounted coaxially with the shank 12 in a manner well known in the art of carbide-tipped router bits with ball bearing guide wheels.

Routing machines of the art are known to have a large flat guide plate that is adapted to rest on the surface of the workpiece. The router bit is held in the chuck of a router by the shank 12 and rotated rapidly by the router motor in the direction shown by the arrow 22. The bit 1 projects through an aperture in the guide plate. A depth adjustment on the router permits precise adjustment of how far the cutting edges of the router bit project below the router guide plate. The router guide plate, a large flat plate is represented diagramatically for drawing convenience by the element 23. In using the router, its contacting surface 24 is rested on the upper surface 7 of the workpiece, and this determines the vertical position of the cutting edges of the router bit. The rotating cutter is first positioned beyond the overhanging edge of the workpiece 2 composed of a wood base 3 and a plastic laminate 5. Then the router is moved horizontally, sliding the guide plate 23 on the laminate surface 7, until the guide wheel 11, bearing against the base edge 4, prevents further movement. The ball bearings in the guide wheel 11 permit it to rest against edge 4 without rotation, thereby preventing marring of the edge 4 while the cutter portion is rapidly rotating. The cutting edge 9 of each cutter blade 21, has a shape that is a combination of three portions. A first straight portion 13 is tangential to an arc portion 14 and is coextensive with the arc at the tangent point at the lower end of the arc. A second straight portion 15 is tangential to the arc portion 14 and is coextensive with the arc at the tangent point at the upper end of the arc. First straight portion 13 forms an acute angle 16 with the axis of rotation 26. The angle 16 is shown here as 15°. Angles of 10° to 20° may be useful. The arc portion 14 is 60° of arc of a circle of radius 0.06". The degrees of arc may vary from 40° to 70°. And the radius may vary from 50% to 130% of laminate thickness. The lowest point 27 of the cutting edge 9 is slightly closer to the axis of rotation than the outer edge 28 of the guide wheel 11. This provides clearance so that this point does not cut the base edge 4 when the guide wheel 11 is pressed against it. The depth of the tool 1 relative to the contacting surface 24 of the router's surface guide plate 23 is adjusted up or down in the direction indicated by arrow 25 until the lower, cemented surface 6 of laminate 5 is cut by that point 29 on the first straight portion 13 that represents the intersection with a line projected from the outer edge 28 of guide wheel 11. This point 29 will cut the cemented surface 6 of laminate 5 exactly flush with the base edge 4 when the guide wheel 11 is against the base edge 4. The lower portion of the core 8 will be cut at a straight bevel of 15° from the vertical to expose minimal core to view. The upper portion of the core 8 and exposed surface 7 of the laminate will be cut to the shape of the small radius to effectively round the upper corner smoothly while exposing only a minimum of core to view. The upper straight portion 15 cuts a bevel, but it and the uppermost portion of the arc 14 will generally only be cutting laminate when irregularities cause high points. They will also produce a pleasant upper edge without gouging the surface or excessively exposing the core. The distance of the straight portion 13 from the point of intersection 29 (the flush cutting point) to the meeting point with the arc 14 has a length of approximapely 0.03 inches. These dimensions were selected for the usual thickness of laminate. They would be changed accordingly to better suit other thicknesses of laminate. The cutting edge may be multiply resharpened without interfering with performance. The cutting tool shown has four blades 21. Only three blades are visible. The left and right blades are seen from their sides and the center blade 30 is seen on edge, where the carbide tip 19 is visible attached by means well known in the art to cutter blade 21. The cutting edge is ground with a positive rake angle 31 between the cutting edge 9 and the axis of rotation 26 such that, when rotated, the upper portion of the cutting edge engages the workpiece before the lower portion (adjacent the guide wheel) does. This angle provides a force downward on the laminate 5, forcing it against the base 3. This improves on the opposite (negative) rake angle of cutters of the prior art that threw chips away from the cutting action, but also tended to lift the laminate away from the base, possibly damaging it. A zero rake angle has also been successfully used.

The guide wheel should be small enough to facilitate trimming inside curves. Cutting wheel diameters of ⅜ to ½ inches have been used successfully.

The above disclosed invention has a number of particular features which should preferably be employed in combination although each is useful separately without departure from the scope of the invention. While I have shown and described the preferred embodiment of my invention, it will be understood what the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A rotary tool for edge dressing a piece of work mounted on a supporting base wherein the edge of said piece of work projects a slight distance beyond the edge of said supporting base, comprising:
   (a) a shank means adapted to be removably gripped by rotatable chuck means;
   (b) a cutter body connected to said shank means below that portion of said shank means that is adapted for gripping;
   (c) a plurality of cutter blade means connected to said cutter body, initiating at said cutter body and extending radially therefrom;
   (d) a ball bearing guide wheel mounted coaxially with and to said shank means below said cutter body so that the outer periphery of said guide wheel can rotatably ride on the edge of said supporting base independently of any rotary movement of said cutter blade means, said wheel supporting said cutter blades in spaced relation to the edge of said supporting base;

(e) said cutter blade means having a cutting edge shape for edge dressing said piece of work to produce a cut edge in said piece that is flush with the edge of said base at their point of contact and that extends upward toward the surface of said piece in a substantially straight line at an acute angle relative to said edge of said base and inward from said edge for a first portion of the distance to the surface, and that extends the second portion of the distance to the surface in an arc, said arc being substantially the arc of a circle whose radius is within thirty percent of the thickness of said piece of work.

2. The tool of claim 1 wherein said first portion of the distance to the surface substantially equals said second portion of the distance to the surface.

3. In the tool of claim 1 said cutting edge shape comprising:

a lower, substantially straight, portion adjacent said guide wheel, said portion forming an acute first angle with the axis of rotation and whose point of initiation adjacent said guide wheel is closer to said axis than the outer edge of said guide wheel;

a middle arcuate portion, substantially an arc of a circle;

an upper, substantially straight portion; wherein said straight portions are coextensive with said arcuate portion and are substantially tangential thereto at their respective points of joining to said arcuate portion.

4. The invention of claim 3, wherein said first angle is within the range from ten to twenty degrees.

5. The invention of claim 3, wherein said arcuate portion extends between fifty and seventy degrees of arc.

6. The invention of claim 3, wherein said circle has a radius that is between 50% and 130% of the thickness of said piece of work.

7. The invention of claim 3, wherein said cutter blade means have carbide tips.

8. The invention of claim 3, wherein said lower portion has a length that is between forty and sixty percent of the thickness of said piece.

9. The invention of claim 3, wherein said guide wheel is a solid pilot cylinder that rotates with said shank means.

10. The invention of claim 3, wherein said cutter blade means have a rake angle that causes the cutting edges that are closest to said guide wheel to engage said piece of work last to force said piece against said base during the trimming operation to prevent delamination.

* * * * *